Figure 1:
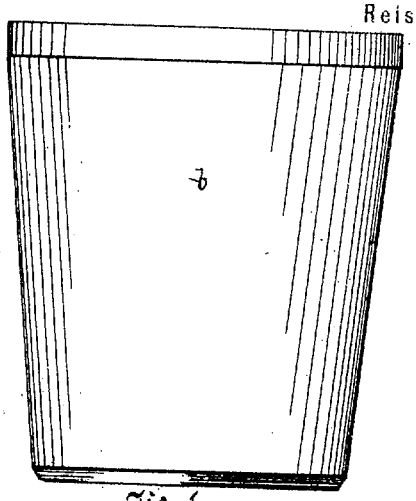

W. DOYLE.

Jelly-Glasses.

No. 5,356.

Reissued April 15, 1873.

Witnesses.
R. C. Ormsbee
James J. Kay

Inventor.
William Doyle
by Bakewell, Christy & Kern
his Att'ys.

UNITED STATES PATENT OFFICE.

WILLIAM DOYLE, OF BIRMINGHAM, PENNSYLVANIA.

IMPROVEMENT IN JELLY-GLASSES.

Specification forming part of Letters Patent No. 136,492, dated March 4, 1873; reissue No. 5,356, dated April 15, 1873; application filed April 11, 1873.

*To all whom it may concern:*

Be it known that I, WILLIAM DOYLE, of Birmingham, State of Pennsylvania, have invented certain Improvements in Jelly-Tumblers, of which the following is a specification:

The object of my invention is to provide a jelly glass or jar with a cap or cover of thin metal or other equivalent material, so secured to the jar as effectually to protect the contents during transportation or while on storage, and at the same time to be capable of easy removal and of reuse.

Previously to my invention, jelly-tumblers were usually covered with cloth, paper, tin-foil, or other flexible material tied over the edge of the vessel. These covers were inconvenient and difficult to apply, and were liable to be ruptured by accidental blows, to be destroyed by insects, or to be deteriorated by various atmospheric influences. I am aware, also, that it had been proposed to use so-called self-sealing covers upon jelly-tumblers, the same to be secured upon the glass by means of a cement or of an elastic rubber ring; but these devices were comparatively imperfect in their operation, were expensive, and ordinarily would be incapable of use a second time. My invention seeks to remedy the various imperfections of all such prior devices, by providing the jelly-glass with a cover of sheet metal or equivalent material, which, while it can be easily secured upon the top of the vessel and easily removed therefrom, will be sufficiently strong to resist injury from ordinary accidents, and of a character to prevent the encroachments of insects and vermin.

The particular construction which I have adopted as the simplest form of carrying out my invention is shown in the drawing, in which—

Figure 2:
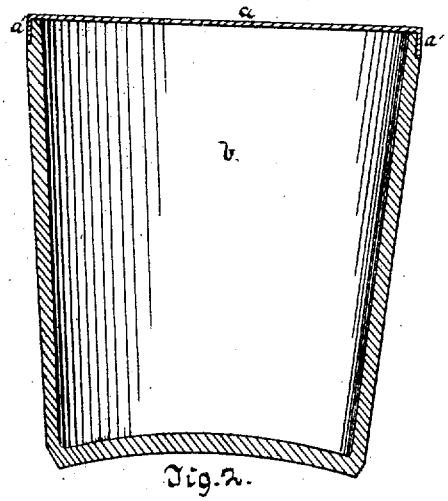

Figure 1 is a side elevation of the jelly glass or jar proper; and Fig. 2 is a like view of the jelly-glass complete, when provided with its metallic cap.

The glass *b* is made tapering inside from the top downward, in order to secure the more ready discharge of the contents of the vessel, and the cap *a* is shown as provided with a flange formed by turning down the edge at right angles, or nearly so, with the body of the cap. By making the cap of a slightly elastic metal, it can be secured in place by simply pressing the flange down over the mouth of the glass, the elasticity of the flange causing it to hug the sides of the glass with sufficient force to hold it firmly upon the tumbler.

The outside of the glass may, if desired, be prepared for receiving the flange in the manner shown in Fig. 1, or by forming a shoulder upon it, as shown in Fig. 2; but while I prefer this mode of construction, both because of its simplicity and because it permits an almost perfect fit of the flange, I do not wish to be understood as limiting myself to this special-formed flange; any mode of shaping the flange that will hold the cover on with sufficient firmness in ordinary handling, and yet permit of its being readily removed when it is desired to use the contents of the jar, may be substituted for the frictional method here shown without departing from the principle of my invention.

I am aware that metal caps have been used upon cylindrical boxes of tin and other metal, as well as upon fruit-jars having their smaller diameter at or near the mouth; but, so far as I know, I am the first to have combined such a cap or cover with a jar of such configuration as to permit its contents, however stiff and firm they may be, to be readily disengaged from the interior of the jar when the jar is inverted. It is plain to see that the article of manufacture thus produced must be of great utility for household and domestic purposes.

In the manufacture of my improved jelly-glass, in order to fit it for the reception of a cap of sheet metal or any equivalent material, I should ordinarily furnish it to the market in the condition, as regards form and finish, in which it comes from the molds, without subjecting it to the usual finishing operations that are applied to drinking-glasses. The application of the ordinary finishing processes would tend to smooth and round the edge of the vessel, as well as to expand or contract its mouth irregularly, thereby seriously interfering with the perfect fitting of the cap, which is made of a size exactly corresponding with the size of the molds in which the jar is formed.

What I claim as my invention is—

1. A jelly-glass adapted for the reception of a cap or cover of sheet metal or equivalent material, by leaving it substantially in the condition in which it comes from the molds, without being subjected to the ordinary finishing processes, as above set forth.

2. A jelly-glass adapted for the reception of a flanged cap or cover of sheet metal, or equivlent material, substantially as hereinbefore described.

3. As an article of manufacture, a jelly-glass provided with a flanged cap or cover of sheet metal or equivalent material.

4. As an article of manufacture, a jelly-glass provided with a cap or cover of sheet metal or equivalent material capable of being secured to the glass without the use of cement, or of rubber bands or rings.

WILLIAM DOYLE.

Witnesses:

THOS. B. ATTERBURY,

SAML. A. DUNCAN.